US00RE45902E

(19) United States
(12) Reissued Patent
Chun et al.

(10) Patent Number: US RE45,902 E
(45) Date of Reissued Patent: Feb. 23, 2016

(54) METHOD OF TRANSMITTING DATA USING REPETITION CODING

(71) Applicant: LG ELECTRONICS INC., Seoul (KR)

(72) Inventors: Jin Young Chun, Anyang-si (KR); Bin Chul Ihm, Anyang-si (KR); Hyun Soo Ko, Anyang-si (KR); Sung Ho Park, Anyang-si (KR); Sunam Kim, Anyang-si (KR)

(73) Assignee: LG Electronics Inc., Seoul (KR)

(21) Appl. No.: 14/106,602

(22) Filed: Dec. 13, 2013

Related U.S. Patent Documents

Reissue of:
(64) Patent No.: 8,391,380
Issued: Mar. 5, 2013
Appl. No.: 12/676,132
PCT Filed: Sep. 3, 2008
PCT No.: PCT/KR2008/005164
§ 371 (c)(1),
(2) Date: Mar. 2, 2010
PCT Pub. No.: WO2009/031801
PCT Pub. Date: Mar. 12, 2009

(30) Foreign Application Priority Data

Sep. 3, 2007 (KR) ..... 10-2007-0088830
Oct. 4, 2007 (KR) ..... 10-2007-0099954

(51) Int. Cl.
*H04K 1/10* (2006.01)
*H04L 1/08* (2006.01)
*H04L 1/00* (2006.01)

(52) U.S. Cl.
CPC ..... *H04L 1/08* (2013.01); *H04L 1/0003* (2013.01)

(58) Field of Classification Search
CPC ... H04L 27/26; H04L 1/0041; H04L 27/2623; H04L 1/08; H04L 1/0003
USPC ..... 375/267, 295, 260
See application file for complete search history.

(56) References Cited

U.S. PATENT DOCUMENTS

| | | | | |
|---|---|---|---|---|
| 7,292,647 | B1 * | 11/2007 | Giannakis et al. | 375/295 |
| 7,430,243 | B2 * | 9/2008 | Giannakis et al. | 375/267 |
| 2001/0034872 | A1 * | 10/2001 | Smallcomb | 714/786 |
| 2003/0095533 | A1 * | 5/2003 | Joo et al. | 370/343 |
| 2008/0144729 | A1 * | 6/2008 | Miyoshi et al. | 375/260 |
| 2008/0192678 | A1 * | 8/2008 | Bertrand et al. | 370/328 |
| 2008/0310540 | A1 * | 12/2008 | Tiirola et al. | 375/267 |
| 2009/0080454 | A1 * | 3/2009 | Koyanagi | 370/445 |

FOREIGN PATENT DOCUMENTS

| | | |
|---|---|---|
| EP | 2433397 | 6/2007 |
| GB | 2433397 | 6/2007 |
| WO | 2004/100501 | 11/2004 |
| WO | 2004/100501 A2 | 11/2004 |
| WO | 2005/101718 | 10/2005 |
| WO | 2006/050131 | 5/2006 |

* cited by examiner

*Primary Examiner* — Linh M Nguyen
(74) *Attorney, Agent, or Firm* — Dentons US LLP

(57) ABSTRACT

A method of transmitting data in a wireless communication system is provided. The method includes generating duplicate data by using repetition coding, the duplicate data being the same as original data, shifting the phase of the duplicate data, and transmitting the original data and the phase-shifted duplicate data. The duplicate data is mapped to a modulation symbol having a different size or phase as that of the original data, thus to reduce the PAPR unlike the general repetition coding.

6 Claims, 2 Drawing Sheets

METHOD OF TRANSMITTING DATA USING REPETITION CODING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a *reissue of, and claims the benefit of, U.S. Pat. No. 8,391,380; however, more than one reissue application has been filed for U.S. Pat. No. 8,391,380. The reissue applications are Ser. No. 14/106,602* (*the present application*) *and Ser. No. 14/337,931, both of which are divisional reissues of U.S. Pat. No. 8,391,380. U.S. Pat. No. 8,391,380 issued on Mar. 5, 2013, which is a* 35 U.S.C. §371 National Stage entry of International Application No. PCT/KR2008/005164, filed on Sep. 3, 2008, and claims [priority to] *the benefit of* Korean Application No. 10-2007-0088830, filed on Sep. 3, 2007 and Korean Application No. 10-2007-0099954, filed on Oct. 4, 2007 each of which is hereby incorporated by reference in its entirety as if fully set forth herein.

TECHNICAL FIELD

The present invention relates to wireless communication and, more particularly, to a method of transmitting data using repetition coding.

BACKGROUND ART

Research on a 4G (4th Generation) mobile communication system, a next-generation communication system, is actively ongoing to provide services with various QoS (Quality of Service) with a transfer rate of about 10 Mbps to users. The 4G mobile communication system is being standardized to aim at cooperatively operating a wired communication network and a wireless communication network and providing integrated services, beyond simple wireless communication services such as mobile communication systems of a previous generation.

As a large capacity communication system, which may process and transmit various information such as images, radio data, or the like, beyond voice-centered services, is requested, development of a technique allowing transmission of large capacity data similar to the capacity of the wired communication network to the wireless communication network is on demand.

Thus, a proper channel coding method that can improve a system performance by minimizing a loss of information and increasing the efficiency of system transmission is recognized and admitted as an essential factor. In general, in order to reduce information loss, the reliability of a system is increased by using various channel codings depending on the properties of channels, one of which is a repetition coding. In the repetition coding, original data to be transmitted is repeated to generate a plurality of same data as the original data. Because the duplicate data, which is the same as the original data, are generated and transmitted together with the original data, the probability of a transmission error can be reduced.

In general, in an OFDM (Orthogonal Frequency Division Multiplexing) system, spectrums of sub-channels overlap with each other while maintaining cross-orthogonality, having good spectrum efficiency, and because OFDM modulation/demodulation is implemented by IFFT (Inverse Fast Fourier Transform) and FFT (Fast Fourier Transform), a modulating/demodulating unit can be effectively implemented digitally and resistant to a frequency selective fading or a narrowband interference.

Despite such advantages, the OFDM system is disadvantageous in that it has a high peak-to-average power ratio (PAPR). The OFDM transmits data by using many carriers, so a final OFDM signal has the size of amplitude tantamount to the sum of amplitude sizes of the respective carriers, having a severe change width of amplitude, and if the phases of the carriers correspond, a quite large value can be obtained. In particular, in case of using the repetition coding in the OFDM system, the same data is repeatedly transmitted, and for uplink, a resource allocation region does not have a square shape, making it difficult to lower the PAPR and possibly degrading the performance of the system.

Thus, in order to data by using repetition coding, a method for lowering the PAPR is required.

DISCLOSURE OF INVENTION

Technical Problem

An object of the present invention is to provide a method of transmitting data using repetition coding capable of reducing a PAPR by dividing data obtained through repetition coding and mapping the divided data to different modulation symbols.

Technical Solution

According to an embodiment of the invention, a method of transmitting data in a wireless communication system is provided. The method includes generating duplicate data by using repetition coding, the duplicate data being the same as original data, shifting the phase of the duplicate data, and transmitting the original data and the phase-shifted duplicate data.

According to another embodiment of the invention, a method of transmitting data in a wireless communication system is provided. The method includes generating duplicate data which is the same as original data by using repetition coding, changing the size and the phase of the duplicate data, and transmitting the original data and the duplicate data with the changed size and phase.

According to still another embodiment of the invention, a data transmitter is provided. The data transmitter includes a data processing unit to perform repetition coding for original data to generate duplicate data, a data changing unit to shift the phase of the duplicate data, and a subcarrier allocating unit to map the original data and the phase-shifted duplicate data to a subcarrier.

Advantageous Effects

In the present invention, because the original data, the result of repeated coding, and duplicate data are discriminated and the duplicate data is mapped to a modulation symbol having a different size or phase as that of the original data and transmitted, to thus reducing the PAPR unlike the general repetition coding.

MODE FOR THE INVENTION

Hereinafter, exemplary embodiments of the present invention will be described in detail with reference to the accompanying drawings so that this disclosure can be through and complete, and will fully convey the concept of the invention to those skilled in the art.

Figure 1:
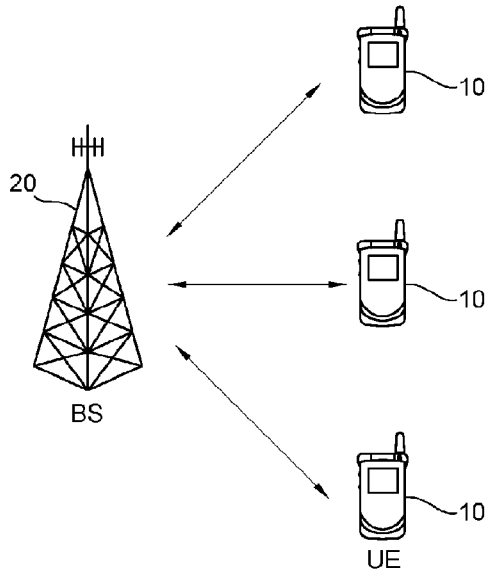
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The BS 20 is generally a fixed station that communicates with the UE 10 and may be referred to as another terminology, such as a node-B, a base transceiver system (BTS), an access point, etc. There are one or more cells within the coverage of the BS 20. The UE 10 may be fixed or mobile, and may be referred to as another terminology, such as a mobile station (MS), a user terminal (UT), a subscriber station (SS), a wireless device, etc.

A downlink represents a communication link from the BS 20 to the UE 10, and an uplink represents a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Downlink and uplink transmissions can be made using different multiple access schemes. For example, orthogonal frequency division multiple access (OFDMA) may be used for downlink transmission, and single carrier-frequency division multiple access (SC-FDMA) may be used for uplink transmission.

There is no restriction on the multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. In these modulation schemes, signals received from multiple users are demodulated to increase capacity of the communication system.

Figure 2:
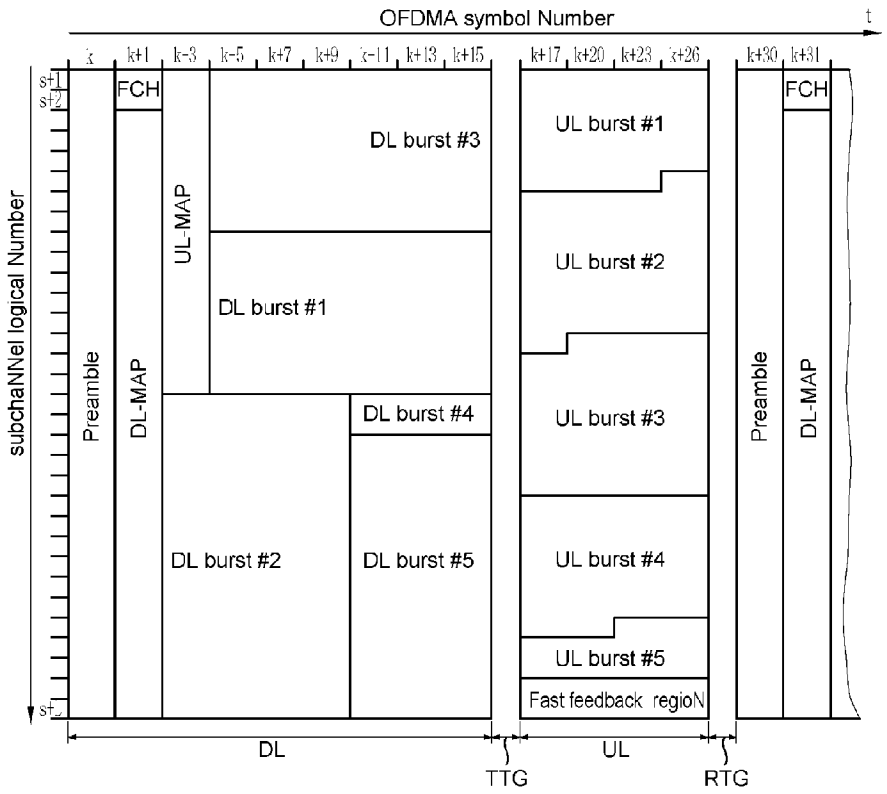
FIG. 2 shows an example of a frame structure.

FIG. 2 shows an example of a frame structure. The frame refers to a data sequence during a fixed time period used by physical specifications, and it may be an OFDMA frame.

With reference to FIG. 2, the frame includes a downlink frame and an uplink frame. Time division duplex (TDD) refers to a method in which uplink and downlink transmissions take place in the same frequency bandwidth but occur at each different time. The downlink frame temporally goes ahead of the uplink frame. The downlink frame includes a preamble, a frame control header (FCH), a DL (Downlink)-MAP, a UL (Uplink)-MAP, a downlink burst region. The uplink frame includes an uplink burst region.

A guard time for discriminating the uplink frame and the downlink frame is inserted to a middle portion of the frame (i.e., between the downlink frame and the uplink frame), and to a final portion (after the uplink frame). A transmit/receive gap (TTG) refers to a gap between the downlink burst and the subsequent uplink burst. A receive/transmit transition gap (RTG) refers to a gap between the uplink burst and a subsequent downlink burst.

The preamble is used for initial synchronization, cell search, frequency offset, and channel estimation between a base station and a mobile station. The FCH includes the length of a DL-MAP message and repetition coding information used for the DL-MAP message. The DL-MAP is a region on which the DL-MAP message is transmitted. The DL-MAP message defines an access of a downlink channel The DL-MAP message includes a configuration change count of a DCD (Downlink Channel Descriptor) and a base station ID (Identifier).

The DCD describes a downlink burst profile applied to a current map. The downlink burst profile refers to characteristics of a downlink physical channel, and the DCD is periodically transmitted by the base station via a DCD message. The UL-MAP is a region on which a UL-MAP message is transmitted. The UL-MAP message defines an access of an uplink channel The UL-MAP message includes a configuration change count of a UCD (Uplink Channel Descriptor) and a valid start time of uplink allocation defined by the UL-MAP.

The UCD describes an uplink burst profile. The uplink burst profile refers to characteristics of an uplink physical channel, and the UCD is periodically transmitted by the base station via a UCD message.

A portion of the uplink frame includes a fast feedback region. The fast feedback region is allocated for a faster uplink transmission than general uplink data, and a CQI, ACK/NACK signal, or the like, may be included in the fast feedback region. The fast feedback region may be positioned anywhere in the link frame and not necessarily limited to the illustrated position or size.

Hereinafter, a slot is a minimum possible data allocation unit and defined as time and a subchannel. In the uplink, subcarrier may include a plurality of tiles. The subcarrier may include six tiles and in the uplink, one burst may include three OFDM symbols and one subcarrier.

In a PUSC (Partial Usage of Subchannels) permutation, each tile may include four contiguous subcarriers on three OFDM symbols. In an optional PUSC permutation, each time may include three contiguous subcarriers on three OFDM symbols. The tiles included in the subcarriers are distributed to every band so as to be disposed.

A bin includes nine contiguous subcarriers on an OFDM symbol. A band refers to a group of four rows of the bin, and AMC (Adaptive Modulation and Coding) subcarrier includes six contiguous bins in the same band.

The FCH including information regarding repetition coding is merely one example of being applied to the system having the frame structure as shown in FIG. 2. Namely, the FCH may be included in a different channel in a different frame structure without being limited to such a frame structure as shown in FIG. 2. Hereinafter, an apparatus and method for transmitting data by using repetition coding according to the present invention will be described.

Figure 3:
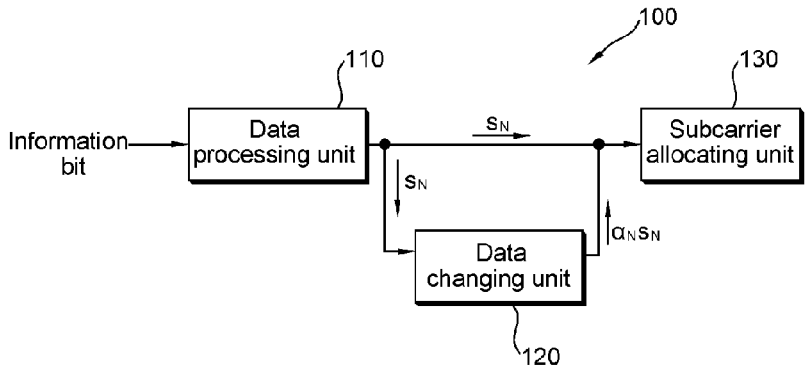
FIG. 3 is a schematic block diagram of a transmitter according to an embodiment of the present invention.

FIG. 3 is a schematic block diagram of a transmitter according to an embodiment of the present invention.

With reference to FIG. 3, the transmitter 100 includes a data processing unit 110, a data changing unit 120, and a subcarrier allocating unit 130. The transmitter 100 may be a part of a base station (BS). The BS refers to a fixed station communicating with a terminal, and may be called a node-B, a base transceiver system (BTS), an access point (AP), or other terms.

The data processing unit 110 repeatedly codes inputted information bits to generate duplicate information bits which are the same as information bits, and maps the information bits and the duplicate information bits to data symbols expressing positions on a signal constellation. Hereinafter, the symbol level data generated by mapping the information bits is called original data and the symbol level data generated by mapping the duplicate information bits is called duplicate data.

The number of duplicate data differs according to the determined number of times of repetition in a system. The information about the number of times of repetition coding is signaled by the transmitter to a receiver via the FCH in the system having such a frame structure as shown in FIG. 2. There is no limitation in the number of times of repetition, and the number of times of repetition may be set two times, four times or six times depending on systems.

The data processing unit 110 discriminates the original data and the duplicate data and sends the original data to the subcarrier allocating unit 130 and the duplicate data to the data changing unit 120.

The data changing unit 120 changes the phase or the size or the phase and size of the duplicate data and transmits the same to the subcarrier allocating unit 130. Hereinafter, the original data is $S_N$ and the duplicate data having a phase which has been shifted by θ by the data changing unit 120 and has a size of k times is $ke^{j\theta}S_N$. θ is a phase difference of the original data and the duplicate data with respect to the same information bits, and 'k' is a ratio of the size of the duplicate data to the original data. Let $e^{j\theta}$ be α for convenience's sake. The duplicate data that has passed through the data changing unit 120 would be $k\alpha S_N$. Here, if 'k' is 1, it means that only the phase of the original data has been shifted, and if 'α' is 1, it means that only the size of the original data has been changed. Because 'k' and 'α' are variables, if the two variables change independently, the duplicate data may be data obtained as both the phase and the size of the original data have been all changed.

The data changing unit 120 may change only the size of the original data to generate duplicate data, or change only the phase of the original data to generate duplicate data, or change both the size and the phase of the original data to generate duplicate data. A PAPR (Peak-to-Average Power Ratio) can be reduced by differentiating the phase or the size of the original data and the duplicate data and transmitting data.

The subcarrier allocating unit 130 appropriately allocates (or maps) inputted original data and duplicate data to subcarriers and multiples them according to users. The subcarrier allocating unit 130 may use various multiplexing schemes such as OFDM as well as SC-FDMA.

In case of using the repetition coding, in general, the same data signal is repeated, so the PAPR is increased. In this case, however, if the original data and the duplicate data are repeatedly coded by differentiating their size or phase, undergo DFT (Discrete Fourier Transform) or IDFT (Inverse Discrete Fourier Transform) and IFFT (Inverse Fast Fourier Transform) (in the form of SC FDMA), and are transmitted, a gain in terms of PAPR can be obtained.

In the SC-FDMA scheme, the subcarrier allocating unit 130 may perform DFT on the contiguous subcarrier, a frequency band used for transmitting the original data or the duplicate data. The data, which has undergone the DFT process with respect to the contiguous subcarrier on a single OFDM symbol, is converted into a signal of frequency domain. The subcarrier allocating unit 130 performs IFFT on the signal which has undergone the DFT process over the entire frequency band to convert it into a signal of a time domain.

In case of using the OFDMA scheme, unlike the SC-FDMA scheme, the transmitter can immediately perform IFFT on the subcarrier without performing DFT process to convert it into a signal of a time domain. In this manner, each OFDM symbol may undergo DFT spreading and then IFFT to maintain low PAPR characteristics.

An example of a simple method for differentiating the size or the phase may be an application of unitary matrix to original data. Namely, N-dimension unitary matrix may be multiplied to the original data to obtain one original data and the (N−1) number of duplicate data.

Equation 1 shows an example of the method of generating duplicate data by using the unitary matrix. The matrix 'C' is a unitary matrix.

MathFigure 1

$$C = \begin{bmatrix} 1 & 1 & 1 & 1 \\ 1 & j & -1 & -j \\ 1 & -1 & 1 & -1 \\ 1 & -j & -1 & j \end{bmatrix} \quad \text{[Math. 1]}$$

For one example, if four original data to which the matrix 'C' is applied is $S_0,S_1,S_2,S_3$, one duplicate data $S_0,S_1,S_2,S_3$, which is the same as the original data, is generated by a first row 1,1,1,1, and the other three remaining duplicate data are $S_0,jS_1,-S_2,-jS_3$, $S_0,-S_1,S_2,-S_3$, and $S_0,-jS_1,-S_2,jS_3$, respectively.

For another example of a simple method of differentiating the size or the phase, a Zadoff-Chu (ZC) CAZAC (Constant Amplitude Zero Auto-Correlation) sequence may be applied. As for the ZC CAZAC sequence, one of CAZAC sequences, if 'N' is the length of a CAZAC sequence, a positive integer, and an index 'M' is a prime number ('M' is a natural number of 'N' or smaller, and 'M' and 'N' are prime numbers with each other) relatively compared with 'N', the kth element of the Mth CAZAC sequence may be expressed by equation 2 shown below:

MathFigure 2

$$c(k; N, M) = \exp\left\{-\frac{j\pi Mk(k+1)}{N}\right\} \quad \text{[Math. 2]}$$

where N is an odd vmber $$c(k; N, M) = \exp\left\{-\frac{j\pi Mk^2}{N}\right\}$$

where N is an even vmber

This is merely an example, and any other sequences having good correlation characteristics may be applied. For different terminals, channels may be discriminated by applying ZC CAZAC sequences each having a different circular shift value.

The unitary matrix 'C' or the CAZAC sequence used for generating the duplicate data by changing the size or the phase of the original data as described above is merely an example. Namely, the unitary matrix used for generating the duplicate data may be a 3×3 matrix, a 5×5 matrix, or the like, besides 4×4 matrix. Also, the size 'k' may be 2, 3, or else, not necessarily '1', and any matrixes may be used so long as they can maintain orthogonality between duplicate data.

The method of repetition coding will be described in detail. In order to clarify the description, if repetition is '2', the size of k=1 will be taken as an example.

Figure 4:
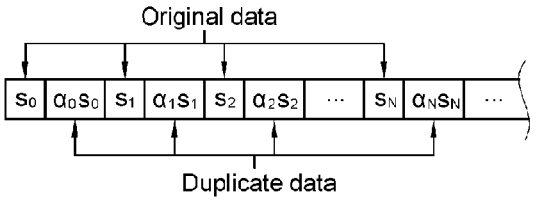
FIG. 4 shows a method of repetition coding according to another embodiment of the present invention.

FIG. 4 shows a method of repetition coding according to another embodiment of the present invention.

With reference to FIG. 4, the repetition coding method includes repeating information bits in units of small data. Namely, according to this repetition coding method, the results of repetition coding have such a form that duplicate data is distributively disposed between original data in view of radio resource domain (time domain or frequency domain). Accordingly, one duplicate data is added per original data, like $S_0,\alpha_0S_0,S_1,\alpha_1S_1,S_2,\alpha_2S_2, \ldots, S_N,\alpha_NS_N$. Here, the phase difference θ between the original data and the duplicate data may be variably set to 0, π/2, π/4, π/6, etc., besides π.

Figure 5:
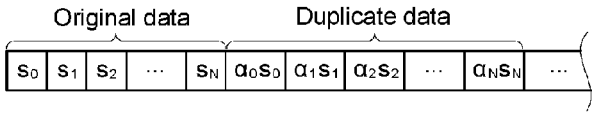
FIG. 5 shows a method of repetition coding according to an embodiment of the present invention.

FIG. 5 shows a method of repetition coding according to an embodiment of the present invention.

With reference to FIG. 5, the repetition coding method includes repeating information bits in units of burst. Namely, according to this method, the results of repetition coding have such a form that original data and duplicate data are locally gather together, in view of radio resource domain (time domain or frequency domain). Accordingly, a set of duplicate data is added to the end of a set of original data, like $S_0, S_1, S_2, \ldots, S_N,\alpha_0S_0,\alpha_1S_1,\alpha_2S_2, \ldots, \alpha_NS_N$. Here, the phase difference θ between the original data and the duplicate data may be variably set to 0, π/2, π/4, π/6, etc., besides π.

The method of repetition coding may be performed variably in addition to those methods as shown in FIGS. 4 and 5.

A method of allocating original data and duplicate data to each subcarrier will now be described. Radio resources may be allocated to the original data and the duplicate data generated according to the method of FIG. 4 or the method of FIG. 5 by using one of a time axis and a frequency axis as a preferential reference. Here, it is assumed that the size (k) of the duplicate data is 1.

Table 1 shows the case of the repetition coding as shown in FIG. 4, in which when $\alpha_0=\alpha_1=\ldots=\alpha_N=-1$ (namely, when the phase difference θ is π), the original data and the duplicate data are distributively disposed in the physical radio resource domain (time domain or frequency domain) and subcarriers are allocated. Namely, the results of the repetition coding are $S_0,-S_0,S_1,-S_1,S_2,-S_2, \ldots, S_N,-S_N$.

TABLE 1

| | OFDM symbol index | | |
|---|---|---|---|
| subcarrier index | #1 | #2 | ... |
| #1 | $S_0$ | $S_1$ | ... |
| #2 | $-S_0$ | $-S_1$ | ... |
| #3 | $S_{10}$ | $S_{11}$ | ... |
| #4 | $-S_{10}$ | $-S_{11}$ | ... |
| #5 | $S_{20}$ | $S_{21}$ | ... |
| #6 | $-S_{20}$ | $-S_{21}$ | ... |
| #7 | $S_{30}$ | $S_{31}$ | ... |
| #8 | $-S_{30}$ | $-S_{31}$ | ... |
| ... | ... | ... | ... |

With reference to Table 1, $S_0$ and $-S_0$ are mapped to subcarriers #1 and #2 on an OFDM symbol #1. $S_1$ and $-S_1$ are mapped to subcarriers #1 and #2 on an OFDM symbol #2. In the same manner, $S_9$ and $-S_9$ are mapped to subcarriers #1 and #2 on an OFDM symbol #9. In the same manner, $S_{10}$ and $-S_{10}$ are mapped to subcarriers #3 and #4 on an OFDM symbol #1. The original data and the duplicate data are mapped to the respective subcarriers on the other remaining OFDM symbols in the same manner.

Table 2 shows the case of the repetition coding as shown in FIG. 5, in which when $\alpha_0=\alpha_1=\ldots=\alpha_N=-1$ (namely, when the phase difference θ is π), original data and duplicate data are locally gather together in the physical radio resource domain (time domain or frequency domain) and subcarriers are allocated. Namely, the results of the repetition coding are $S_0,S_1, S_2, \ldots, S_N,-S_0,-S_1,-S_2, \ldots, -S_N$.

TABLE 2

| | OFDM symbol index | | |
|---|---|---|---|
| subcarrier index | #1 | #2 | ... |
| #1 | $S_0$ | $S_1$ | ... |
| #2 | $S_{10}$ | $S_{11}$ | ... |
| #3 | $S_{20}$ | $S_{21}$ | ... |
| ... | ... | ... | ... |
| #k | $-S_0$ | $-S_1$ | ... |
| #k + 1 | $-S_{10}$ | $-S_{11}$ | ... |
| #k + 2 | $-S_{20}$ | $-S_{21}$ | ... |

When information bits are repeatedly coded in units of burst data, radio resources are allocated such that duplicate data is allocated starting from a position where allocation of original data is finished.

With reference to Table 2, with respect to the original data, OFDM symbols #1 to #9 are first allocated in the subcarrier #1, and the OFDM symbols #1 to #9 are then allocated in the subcarrier #2. Resource allocation for the duplicate data starts from a position where resource allocation for the original data is finished. With respect to the duplicate data, the OFDM symbols #1 to #9 are first allocated in the subcarrier #k, and the OFDM symbols #1 to #9 are then allocated in the subcarrier #k+1.

Table 3 shows the case of repetition coding as shown in FIG. 4, in which when $\alpha_0=\alpha_1=\ldots=\alpha_N=1$ (namely, when the phase difference θ is 0), the original data and the duplicate data are distributively disposed in the physical radio resource domain (time domain or frequency domain) and subcarriers are allocated. Namely, the results of the repetition coding are $S_0,S_0,S_1,S_1,S_2,S_2, \ldots, S_N,S_N$.

TABLE 3

| | OFDM symbol index | | |
|---|---|---|---|
| subcarrier index | #1 | #2 | ... |
| #1 | $S_0$ | $S_1$ | ... |
| #2 | $S_0$ | $S_1$ | ... |
| #3 | $S_{10}$ | $S_{11}$ | ... |
| #4 | $S_{10}$ | $S_{11}$ | ... |
| #5 | $S_{20}$ | $S_{21}$ | ... |
| #6 | $S_{20}$ | $S_{21}$ | ... |
| #7 | $S_{30}$ | $S_{31}$ | ... |
| #8 | $S_{30}$ | $S_{31}$ | ... |
| ... | ... | ... | ... |

With reference to Table 3, unlike the case of Table 1, the phase difference θ is 0, a signal has original data and duplicate data which have the same phase. The order of resource allocation is the same as that of Table 1.

Table 4 shows the case of repetition coding as shown in FIG. 5, in which in which when $\alpha_0=\alpha_1=\ldots=\alpha_N=-1$ (namely, when the phase difference θ is 0), original data and duplicate data are locally gather together in the physical radio resource domain (time domain or frequency domain) and subcarriers are allocated. Namely, the results of the repetition coding are $S_0, S_1, S_2, \ldots, S_N, S_0, S_1, S_2, \ldots, S_N$.

TABLE 4

| | OFDM symbol index | | |
|---|---|---|---|
| subcarrier index | #1 | #2 | ... |
| #1 | $S_0$ | $S_1$ | ... |
| #2 | $S_{10}$ | $S_{11}$ | ... |
| #3 | $S_{20}$ | $S_{21}$ | ... |
| ... | ... | ... | ... |
| #k | $S_0$ | $S_1$ | ... |
| #k + 1 | $S_{10}$ | $S_{11}$ | ... |
| #k + 2 | $S_{20}$ | $S_{21}$ | ... |
| ... | ... | ... | ... |

With reference to Table 4, unlike the case of Table 2, the phase difference is 0, and a signal has original data and duplicate data which have the same phase. The order or resource allocation is the same as that of Table 2.

Figure 6:
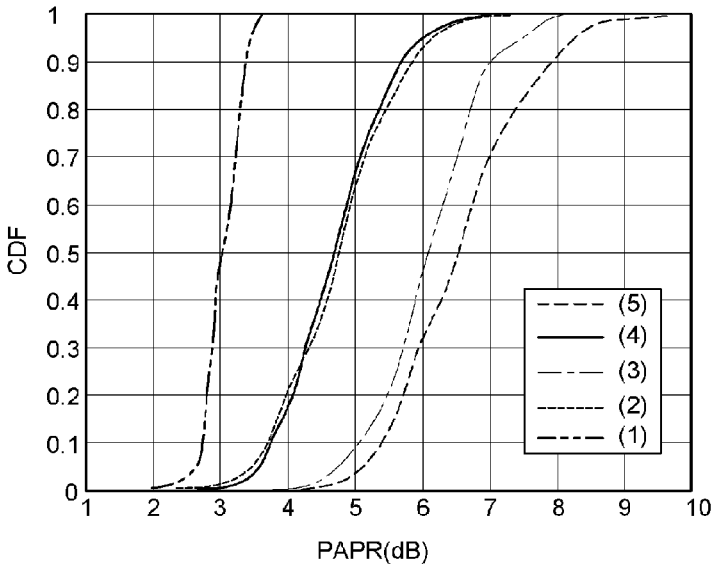
FIG. 6 is a graph comparatively showing PAPRs in case of using the repetition coding according to Table 1 to Table 4.

FIG. 6 is a graph comparatively showing PAPRs in case of using the repetition coding according to Table 1 to Table 4, in which a horizontal axis indicates the size of PAPRs in SC-FDMA (Single Carrier-FDMA) employing 24 DFT (Discrete Fourier Transform) by decibel (dB), and a vertical axis indicates a CDF (Cumulative Distribution Function) capacity of PAPRs. For comparison, a PAPR in the general OFDMA is also shown.

With reference to FIG. 6, (1) shows the case of Table 1, (2) shows the case of Table 2, (3) shows the case of Table 3, (4) shows the case of Table 4, and (5) shows the case of using the related art repetition coding technique.

As shown in the graph, it is noted that the case (1) has a remarkably low PAPR, and the cases (1) to (4) have lower PAPRs than that of the case (5). Namely, by discriminating the original data and the duplicate data, the results of the repetition coding, mapping the duplicate data to a modulation symbol having a different phase from that of the original data, and transmitting data, the PAPR can be lowered unlike the case of the general repetition coding.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting data in a wireless communication system, the method comprising:

*receiving information about a number of times of repetition coding;* generating duplicate data by using repetition coding, the duplicate data being the same as original data;

changing [the] *a* phase of the duplicate data;

allocating the original data and the phase-changed duplicate data to the subcarriers in a same orthogonal frequency division multiplexing (OFDM) symbol; and transmitting the original data and the phase-changed duplicate data, wherein the original data are transmitted through a first frequency band being comprised of contiguous subcarriers and the phase-changed duplicate data are transmitted through a second frequency band being comprised of contiguous subcarriers, the first frequency band and the second frequency band are different frequency bands in *a* frequency domain,

*wherein a number of the duplicate data is determined by the number of times of the repetition coding.*

2. The method of claim 1, wherein the phase of the duplicate data are changed by a unitary matrix 'C' which is $$C = \begin{bmatrix} 1 & 1 & 1 & 1 \\ 1 & j & -1 & -j \\ 1 & -1 & 1 & -1 \\ 1 & -j & -1 & j \end{bmatrix}.$$

3. The method of claim 1, wherein the phase of the duplicate data are changed by a CAZAC (Constant Amplitude Zero Auto-Correlation) sequence.

4. A method of transmitting data in a wireless communication system, the method comprising:

generating duplicate data which is the same as original data by using *a* repetition coding;

changing [the] *a* size and [the] *a* phase of the duplicate data;

allocating the original data and the duplicate data with the changed size and phase to the subcarriers in a same orthogonal frequency division multiplexing (OFDM) symbol; and transmitting the original data and the duplicate data with the changed size and phase.

5. The method of claim 4, further comprising:

after the size and the phase of the duplicate data are changed, performing discrete fourier transform (DFT) and inverse fast fourier transform (IFFT) in sequence.

6. A data transmitter comprising:

a data processing unit to perform repetition coding for original data to generate duplicate data, *wherein the number of duplicated data is determined by a number of times of the repetition coding*;

a data changing unit to change [the] *a* phase of the duplicate data; and a subcarrier allocating unit to map the original data and the phase-changed duplicate data to subcarriers in a same orthogonal frequency division multiplexing (OFDM) symbol, wherein the original data are transmitted through a first frequency band being comprised of contiguous subcarriers and the phase-changed duplicate data are transmitted through a second frequency band being comprised of contiguous subcarriers, the first frequency band and the second frequency band are different frequency bands in *a* frequency domain.

* * * * *

UNITED STATES PATENT AND TRADEMARK OFFICE

CERTIFICATE OF CORRECTION

PATENT NO. : RE45,902 E
APPLICATION NO. : 14/106602
DATED : February 23, 2016
INVENTOR(S) : Chun et al.

It is certified that error appears in the above-identified patent and that said Letters Patent is hereby corrected as shown below:

In the Specification

At Column 1, replace Lines 13-19 (approx.), with the following:

--*NOTICE: More than one reissue application has been filed for the reissue of U.S. Patent No. 8,391,380 B2. The reissue applications are U.S. Reissue Patent Application Serial No. 15/152,309, filed on May 11, 2016, now U.S. Reissue Patent No. RE47,602 E, issued September 10, 2019, which is a continuation reissue application of U.S. Reissue Patent Application Serial No. 14/337,931, filed on July 22, 2014, now U.S. Reissue Patent No. RE46,039 E, issued June 21, 2016, which is a continuation reissue application of U.S. Reissue Patent Application Serial No. 14/106,602 (the present application), filed on December 13, 2013, now U.S. Reissue Patent No. RE45,902 E, issued February 23, 2016, which is a reissue application of U.S. Patent Application Serial No. 12/676,132, filed on March 2, 2010, now U.S. Patent No. 8,391,380 B2, issued March 5, 2013, which is a 35 U.S.C. § 371*--

Signed and Sealed this
Twentieth Day of October, 2020

Andrei Iancu

Andrei Iancu
*Director of the United States Patent and Trademark Office*